United States Patent [19]

Casasanta

[11] 4,367,417

[45] Jan. 4, 1983

[54] OVERHEAD LIGHTING ELECTRICAL DISTRIBUTION SYSTEM

[75] Inventor: Salvatore J. Casasanta, Farmington, Conn.

[73] Assignee: The Wiremold Company, West Hartford, Conn.

[21] Appl. No.: 173,958

[22] Filed: Jul. 31, 1980

[51] Int. Cl.³ ............................................. H05B 37/00
[52] U.S. Cl. .................................. 307/147; 307/157; 339/29 R; 174/49
[58] Field of Search .................. 307/147, 157; 179/48, 179/72 R, 49; 339/28, 29 R

[56] References Cited

PUBLICATIONS

"Task Lighting Considerations", NECA, Electrical Design Library, 16d, Dec. 1977, pp. 6-7.
"Task Lighting Considerations", NECA, Electrical Design Library, 16d, Dec. 1977, pp. 6-7, 'Overhead Distribution System'.

*Primary Examiner*—G. Z. Rubinson
*Assistant Examiner*—James L. Dwyer
*Attorney, Agent, or Firm*—Hayes & Reinsmith

[57] ABSTRACT

An overhead raceway or duct is pre-wired with six conductors, including two hot legs and two switch legs. Identical six socket receptacles are spaced along the raceway, the corresponding sockets of each receptacle being pre-wired to the same conductors. There is also provided a plurality of whips or pre-wired cables having identical six-prong plugs on the opposite ends thereof for selectively connecting the lamps either directly to the hot legs for continuous energization or else indirectly to the hot legs through the switch legs and a wall switch so that the energization of a lamp is under the control of the switch. The lamp fixtures are provided with the same identical six-socket receptacles which are wired to the two ballast circuits in each fixture. Thus, lamp fixtures may be easily connected to the raceway for either mode of operation without the need for making any wiring changes. If a wall partition is moved to change the size of a room and, thus, the number of lamp fixtures to be controlled from the wall switch, the lengths of the switch legs can be easily changed by either splicing or cutting them to increase or reduce, respectively, the number of lamp fixtures controlled by the wall switch via the switch legs.

4 Claims, 10 Drawing Figures

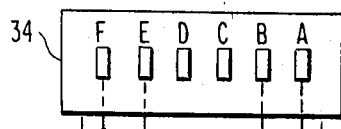
FIG.3
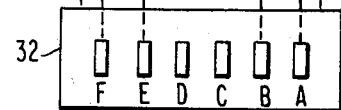
FIG.4
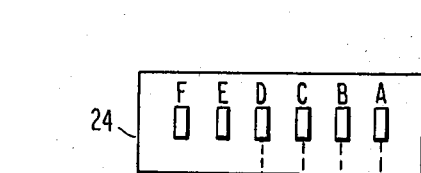
FIG.6
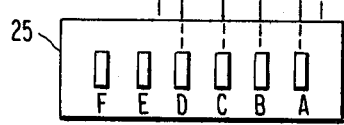
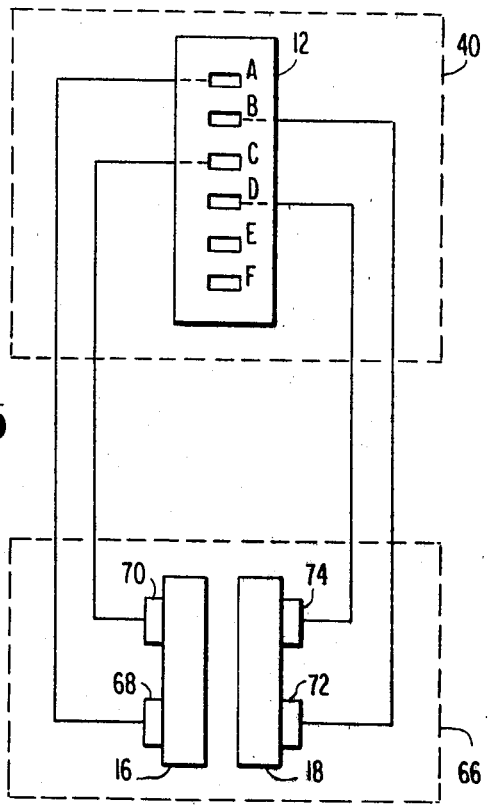
FIG.5
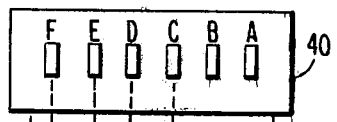
FIG.7
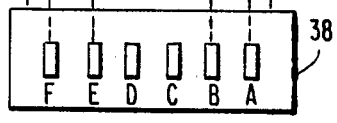

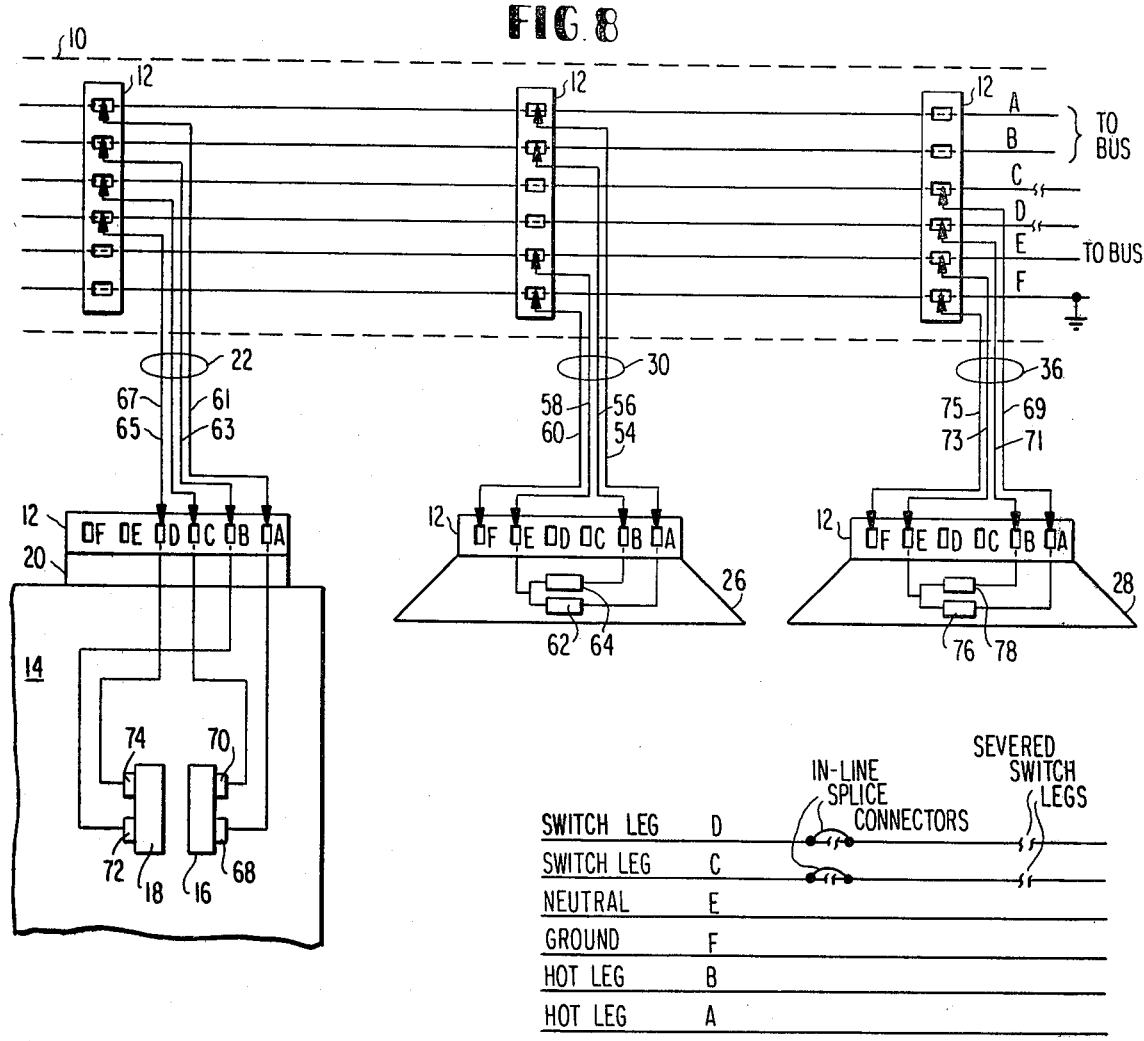
FIG.8
FIG.10
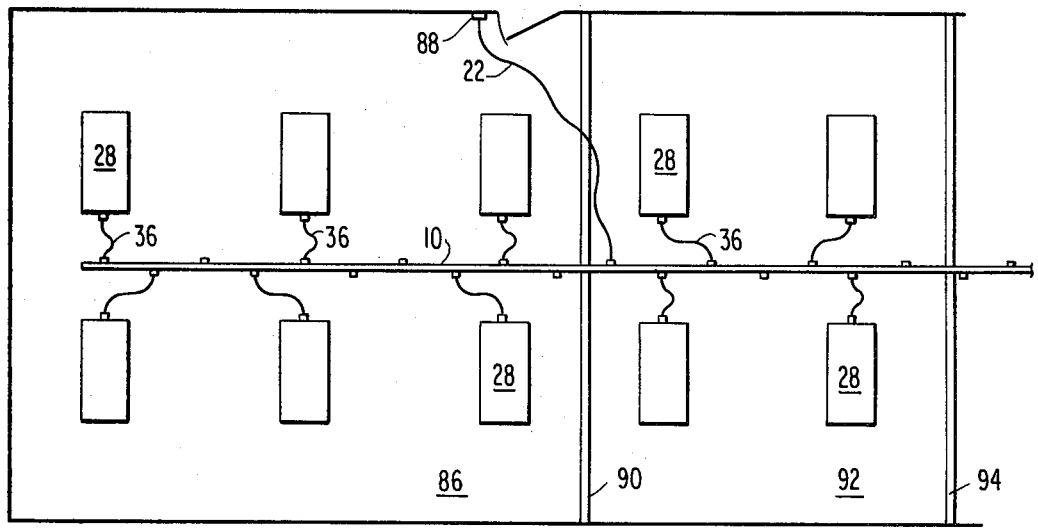
FIG.9

OVERHEAD LIGHTING ELECTRICAL DISTRIBUTION SYSTEM

BACKGROUND OF THE INVENTION

1. Field of the Invention

This invention relates to the field of overhead electrical distribution systems and, more particularly, to such a system provided with a six conductor pre-wired overhead raceway to which pre-wired cables may be selectively connected to provide either switched power or continuous, unswitched power to dual-ballasted fluorescent lamp fixtures.

2. Description of the Prior Art

It is broadly known to provide an overhead electrical distribution system for selectively supplying power to a plurality of ceiling-mounted fluorescent lamp fixtures coupled to a plurality of branch circuits which are connected to a common power bus. One such prior art system is shown in U.S. Pat. No. 4,001,571. However, in this prior art system, each branch circuit consists of the conventional four conductors: two hot conductors, a neutral conductor and a ground conductor. The lamp fixtures contain four-socket receptacles, and fixtures are connected to the power bus by means of a cable having a matching four-prong plug on one end thereof, the other end thereof being wired to a junction box on the power bus. Adjacent lamp fixtures may be interconnected by cables having four-pronged plugs on opposite ends thereof, one of the plugs also having a four-socket receptacle for receiving another plug. In order to provide switched power to a single lamp fixture or to a group of lamp fixtures, a switch adaptor must be inserted into a branch circuit or between a branch circuit and the fixture or group of fixtures. The switch adaptor must be wired to a wall switch. Furthermore, all of the plugs are not identical, and all of the receptacles are not identical.

SUMMARY OF THE INVENTION

The general object of the invention is to provide an improved overhead power distribution system for ceiling-mounted flourescent lamp fixtures which illuminate an area which may be changed by the relocation of wall partitions.

Another object of the invention is to provide such an overhead distribution system wherein each branch circuit is in the form of a hollow raceway containing six conductors and having spaced along the length thereof identical connector receptacles whose terminals are identically ired to the conductors within the raceway.

Another object is to provide a plurality of different control whips or cables having identical connector plugs for mating with the raceway receptacles and for supplying either switched or continuous, unswitched power to the lamp fixtures via fixture receptacles identical to the raceway receptacles.

A more specific object of the invention is to provide such an electrical distribution system with a branch circuit raceway having six conductors, including two switch conductors or legs, and wherein the raceway receptacles have six sockets, corresponding ones of which are identically wired to the six conductors, thereby to provide, in combination with the different control whips, a means for supplying either switched or unswitched power to a fluorescent lamp fixture or to a group of such fixtures without the need for the prior art switch adaptors.

A further object of the invention is to provide, for use in such an improved overhead distribution system, interchangeable control whips which are pre-wired in different manners such that either switched or un-switched power is supplied to a lamp fixture merely by using the correct control whip.

Another object is to provide such an improved overhead distribution system wherein all connector receptacles are identical, and wherein all connector plugs are identical, but wherein the pre-wiring of the raceway and the different control whips is such that, if the wrong control whip is connected between two receptacles, no damage is done even though the desired control function may not be achieved.

Thus, the invention may be broadly summarized as an improved overhead power distribution system of the type having one or more branch circuits connected to a power bus, and wherein each branch circuit consists of a hollow raceway having six conductors: two hot conductors, two switch conductors, a neutral conductor and a ground conductor. A plurality of identical six-socket receptacles are spaced along the length of the raceway and have their corresponding sockets identically wired to the six conductors. The system includes a plurality of control whips or cables: a switch whip for interconnecting a receptacle on the raceway and a receptacle associated with a wall switch; an un-switched light fixture whip to be connected between a raceway receptacle and a light fixture receptacle for continuously supplying power to a dual-ballast fluorescent light fixture whenever power is supplied to the bus connected to the branch circuit; and a switched light fixture whip to be connected between a raceway receptacle and a lamp fixture receptacle for supplying power under the control of a wall switch and via the two switch legs in the raceway to a dual-ballast fluorescent lamp fixture.

BRIEF DESCRIPTION OF THE DRAWING

FIG. 3 is a schematic diagram illustrating the manner in which an un-switched light fixture whip is pre-wired to provide continuous power to a dual ballast fluorescent lamp fixture whenever power is supplied to the bus to which the conductors of the raceway are connected.

FIG. 4 is a schematic diagram showing the manner in which a dual ballast fluorescent lamp fixture is internally wired to its external six-socket connector receptacle.

FIG. 5 is a schematic diagram illustrating the manner in which two-single pole wall switches are wired to a receptacle on a conduit box in the wall.

FIG. 6 is a schematic diagram illustrating the manner in which a switch whip is pre-wired in order to provide the connection between the wall switch conduit receptacle and the conductors within the raceway.

FIG. 7 is a schematic diagram illustrating the manner in which a switched light fixture whip is pre-wired in order to provide switch-controlled power via the switch legs or conductors in the raceway to a dual ballast light fixture.

FIG. 8 is a schematic wiring diagram illustrating the current paths that are involved when all three control whips are employed in the improved distribution system.

FIG. 9 illustrates the manner in which the improved overhead distribution system facilitates the modification of the control of ceiling-mounted fluorescent lamp fixtures to accommodate a change in the number of fixtures to be controlled by a wall switch.

FIG. 10 is a schematic diagram illustrating the simple wiring change to be made in order to accommodate the modification illustrated in FIG. 9.

DETAILED DESCRIPTION OF THE PREFERRED EMBODIMENT

Figure 1:
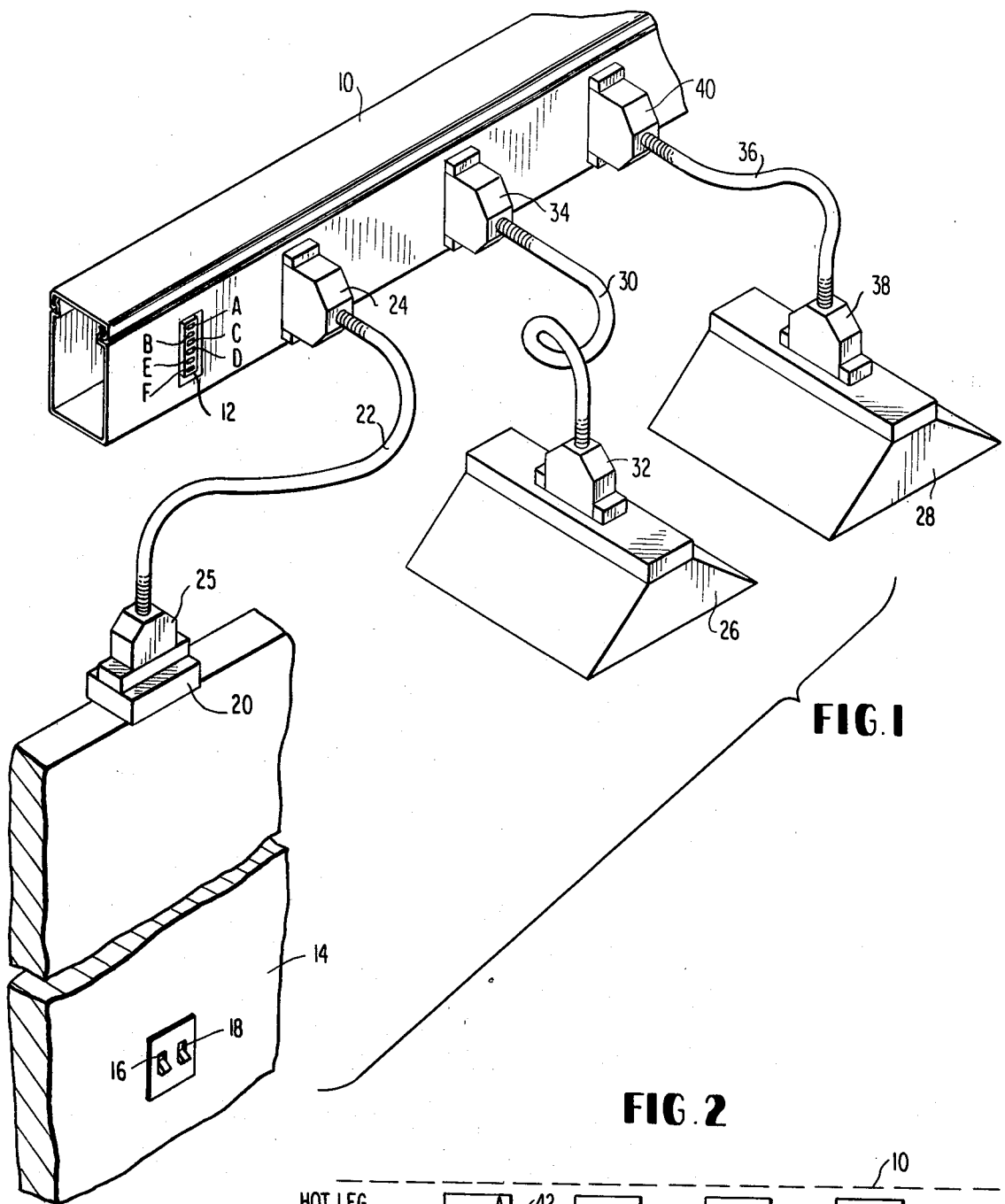
FIG. 1 is a perspective pictorial view of the improved overhead distribution system showing the hollow raceway having identical six-socket connector receptacles spaced along the length thereof, and illustrating the manner in which the three different control whips are connected between the raceway receptacles and a connector receptacle on the conduit box of a wall switch, and between the raceway receptacles and the connector receptacles on two fluorescent lamp fixtures.

FIG. 1 schematically illustrates one branch of an overhead power distribution system embodying this invention. More specifically, a hollow raceway 10 encloses six insulated conductors (not shown). Evenly spaced along the length of raceway 10 are a plurality of identical six-socket connector receptacles, such as receptacle 12. The corresponding sockets of each receptacle are pre-wired to the same one of the six conductors in the raceway in a manner to be described in more detail below. However, for ease of reference, the letters A, B, C, D, E and F will be used to designate the corresponding six receptacle sockets, plug prongs and raceway conductors throughout this specification.

Mounted within a room wall 14 are two single pole switches 16 and 18 which are pre-wired to another identical six-socket receptacle 12 (FIGS. 5 and 8) in the top of a conduit box 20 mounted on the top of wall 14. A prewired switch control whip or cable 22 has on its opposite ends identical six-prong connector plugs 24 and 25 which are plugged into the conduit box receptacle and another raceway receptacle 12, respectively. There will be discussed below the manner in which switch whip 22 is pre-wired to provide switching control via a pair of the six conductors in the raceway 10.

For the purpose of illustration, two dual-ballast fluorescent lamp fixtures 26 and 28 are also shown connected to the branch circuit raceway 10 by control whips or cables. Of course, additional lamp fixtures may be connected in a similar manner. On the top of each of the lamp fixtures 26 and 28 is another identical six-socket connector receptacle 12 which is pre-wired to the two ballast circuits to provide electrical power thereto.

A pre-wired un-switched fixture control whip or cable 30 has on its opposite ends identical six-prong connector plugs 32 and 34 which are respectively plugged into the lamp fixture receptacle and into another one of the receptacles 12 on the raceway 10. This un-switched fixture whip 30 provides continuous or unswitched power to the fixture 26 whenever power is applied to the bus (not shown) to which the branch circuit is connected via a conventional junction box, for example.

Similarly, fixture 28 is connected to the branch circuit by means of a pre-wired switched fixture control whip or cable 36 having on its opposite ends identical six-prong connector plugs 38 and 40 which are respectively plugged into the receptacle on fixture 28 and another one of the receptacles 12 on raceway 10. As will be described in more detail below, switched fixture whip 36 is pre-wired in such a manner that power supplied to fixture 28 is controlled via two of the six raceway conductors and the wall switches 16 and 18.

All of the connector receptacles 12 are identical in that the six sockets are of identical size and shape and arranged in the same pattern for receiving any one of the six-prong connector plugs, all of which are identical in that they contain six prongs arranged in a pattern to mate with the receptacle sockets. The receptacles and plugs are polarized so that the prongs of the plug will be received by the sockets of the receptacle only in the correct orientation such that plug prongs A, B, C, D, E and F will mate with only the receptacle sockets A, B, C, D, E and F, respectively.

Figure 2:
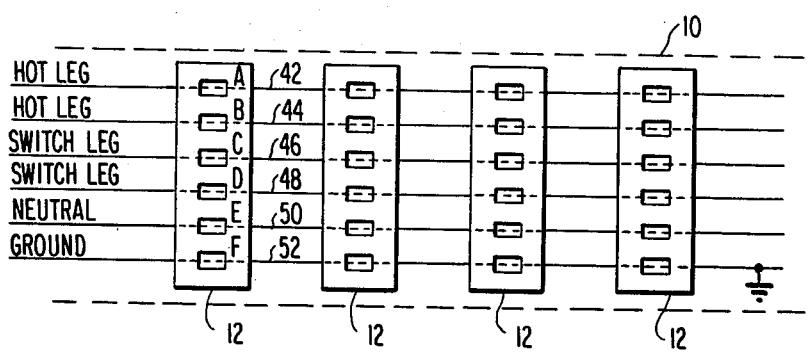
FIG. 2 is a schematic diagram illustrating the manner in which the six sockets of each raceway receptacle are electrically connected to the six conductors within the raceway.

FIG. 2 schematically illustrates the manner in which each of the receptacles 12 in the raceway 10 is pre-wired to the six conductors in the raceway. The six sockets of each receptacle 12 are pre-wired to the corresponding six raceway conductors 42, 44, 46, 48, 50 and 52 which are also designated by the letters A, B, C, D, E and F, respectively. Conductors A and B are the hot conductors which are conventionally connected through a junction box to a power bus along with the neutral conductor E. The ground conductor F is suitably grounded. The function of the switch legs or conductors C and D will be explained below.

FIG. 3 illustrates the manner in which the un-switched whip 30 is pre-wired for supplying continuous, un-switched power to the dual-ballast fluorescent lamp fixture 26 which is internally pre-wired to a receptacle 12 as illustrated in FIG. 4. The un-switched whip 30 contains conductors 54 and 56 respectively interconnecting the A and B prongs or terminals of the connector plugs 32 and 34. The prongs C and D are un-wired. Conductors 58 and 60 respectively interconnect the corresponding plug prongs E and F in the two plug connectors 32 and 34. When the plug connector 34 is plugged into a receptacle 12 in the raceway 10 and the connector plug 32 is plugged into the receptacle 12 on the fluorescent lamp fixture 26, then 60 Hz alternating current power is supplied from the hot A and B raceway conductors 42 and 44, through the whip conductors 56 and 58, the two ballast circuits 62 and 64, the whip conductor 58, and back to the neutral E conductor 50 in raceway 10. Thus, even though all of the receptacles 12 in the raceway 10 are identically pre-wired to the six raceway conductors, the C and D switch legs or conductors 46 and 48 are not used in this case.

FIG. 5 schematically illustrates the manner in which the wall switches 16 and 18 in an electrical box 66 are pre-wired to the receptacle 12 in the box 20 on top of the wall 14 (FIGS. 1 and 8). The switches 16 and 18 are singlepole switches. The receptacle sockets A and C are wired directly to the terminals 68 and 70, respectively, of switch 16, and the receptacle sockets B and D are wired directly to the terminals 72 and 74, respectively, of switch 18. Thus, when the plug 25 of the switch control whip 22 (FIGS. 1 and 6) is inserted into the receptacle 12 in the box 20, and the plug 24 is inserted into a receptacle 12 in the raceway 10, the switches are connected in circuit with the raceway A, B, C and D conductors 42, 44, 46 and 48 as schematically illustrated in FIG. 8.

FIG. 6 illustrates the manner in which the switch whip 22 is pre-wired for properly interconnecting the wall switches 16 and 18 with the C and D raceway switch legs or conductors 46 and 48. Here, the corresponding A, B, C and D prongs of plug 24 and plug 25 are wired together by conductors 61, 63, 65 and 67, respectively.

FIG. 7 illustrates the manner in which the switched fixture whip 36 is pre-wired to provide switched or interruptable power to the fluorescent lamp fixture 28. Here, the C and D prongs of the raceway plug 40 are directly wired by conductors 69 and 71 to the A and B prongs, respectively, of the fixture plug 38. Furthermore, the E and F prongs of plug 40 are directly wired by conductors 73 and 75 to the E and F prongs, respectively, of plug 38. Thus, when plug 38 is inserted in the receptacle 12 on the lamp fixture 28 and the plug 40 is inserted in a receptacle 12 in the raceway 10, the A and B sockets of the receptacle 12 on the fixture 28 become electrically connected to the C and D switch legs or conductors 46 and 48 in the raceway, while the E and F sockets are electrically connected to the E and F raceway conductors 50 and 52, respectively. Thus, power supplied to the two ballast circuits 76 and 78 in the fixture 28 is separately controlled by the corresponding wall switch 16 or 18 as shown in FIG. 8.

More specifically, and as shown in FIGS. 1 and 8, power on the raceway A hot leg or conductor 42 flows through the A socket of the left hand receptacle 12 in the raceway 10, through conductor 61 of switch whip 22 to the lower terminal 68 of switch 16 and through the switch and terminal 70 to the C socket of the receptacle; through conductor 67 of whip 22, the raceway C switch leg or conductor 46, the C socket of the right hand raceway receptacle 12, the conductor 69 of fixture whip 36, the A socket of receptacle 12 on fixture 28, and then through the ballast circuit 76 to the E socket and through conductor 73 of fixture whip 36 and thence to the raceway E neutral conductor or leg 50. A similar circuit can be traced from the raceway B hot conductor 44 through the raceway D switch leg or conductor 48, receptacle sockets, plug prongs, whip conductors and switch 18 to the ballast circuit 78. Thus, switches 16 and 18 individually control the supply of power to the individual ballast circuits 76 and 78, respectively, of lamp fixture 28.

FIG. 8 is a complete wiring diagram corresponding to the pictorial diagram of FIG. 1 and shows the improved overhead distribution system incorporating, as an example, a raceway section including one switch whip, one unswitched fixture whip, and one switched fixture whip, all connected to the raceway. It can be seen that un-switched fixture whip 30 effectively connects the two ballast circuits of fixture 26 between different sides of the conventional three-wire A.C. supply system. The switch whip 22 effectively connects wall switch 16 in series between the raceway hot A conductor 42 and C switch conductor 46, and wall switch 18 in series between the raceway B hot conductor 44 and D switch conductor 48. Furthermore, the switched fixture whip 36 effectively connects ballast circuit 76 in series with the raceway C switch conductor 46 and the E neutral conductor 50, and the ballast circuit 78 in series with the raceway D switch conductor 48 and the E neutral conductor 50. Thus, the fluorescent lamps connected to the two ballast circuits may be separately turned on and off by operation of the wall switches 16 and 18. The arrowheads in FIG. 8 represent plug prongs.

FIGS. 9 and 10 illustrate the ease with which the area lighted by a branch circuit can be changed by the use of these pre-wired control whips and pre-wired receptacles. As shown in FIG. 9, if the room area 86 is initially lighted by six switched fluorescent lamp fixtures 28 connected to the raceway 10 by switched fixture whips 36 under the control of a wall switch 88 connected to the raceway by a switch whip 22, and the original partition 90 is removed to redefine the lighted space as also including the area 92 bounded by a new partition 94, and wherein the added area 92 includes four additional fluorescent lamps to which it is desired also to apply switched power, then the interrupted or severed raceway switch legs C and D in the raceway 10 of the left hand side of the original partition 90 are merely re-spliced together, and the switch legs C and D are then severed just inside of the new partition 94. Thus, with just this minimum wiring change, the additional four lamps 28 in the area 92 are automatically connected through the wall switch 88 via the switch whip 22 and the raceway switch legs C and D, without the need of the adaptors required in the prior art.

FIG. 10 is a schematic wiring diagram showing the six raceway conductors and the manner in which they are re-spliced and severed to accomplish the expanded lighting area illustrated in FIG. 9. Thus, switched lighting zones may be established within the raceway merely by cutting or opening the C and D switch legs where desired.

All of the receptacles in the improved overhead distribution system are identical and are polarized properly to mate with the identical plugs on the three different control whips. The control whips are pre-wired to perform the functions for which they are designed. Any plug will fit in any receptacle; however, if the wrong control whip is chosen for a particular connection, such a connection is electrically safe, even though, of course, the intended function would not be achieved.

I claim:

1. In an overhead power distribution system for distributing electrical power to a plurality of overhead lamp fixtures for lighting a floor area and including: at least one branch circuit connected to a power bus, the lamp fixtures being energized from the branch circuit, the branch circuit including a hollow raceway extending over the floor area and enclosing a plurality of raceway conductors; and wall switch means for controlling the supply of power to at least one of the lamp fixtures; the improvement wherein:

the plurality of conductors comprises at least a first hot conductor and a neutral conductor, both connected to the power bus, and at least a first floating switch conductor; and comprising:

a plurality of identical multiple-socket raceway connector receptacles spaced along the length of the raceway, the sockets of each receptacle being wired to a different one of said raceway conductors, and the corresponding sockets of said receptacles being wired to the same raceway conductor;

a multiple-socket switch connector receptacle, identical to said raceway receptacles, having its sockets wired to the wall switch means;

a multiple-socket fixture connector receptacle, identical to said raceway receptacles, on each lamp fixture and wired to the lamp circuits thereof; and a plurality of interchangeable pre-wired control cable means having identical connector plugs on their opposite ends, said plugs being matable with all of said connector receptacles;

said control cable means comprising:
- an unswitched fixture cable means for directly interconnecting a first raceway receptacle and the fixture receptacle on a first lamp fixture for connecting said first fixture in circuit with said hot and neutral raceway conductors so that electrical power is continuously supplied from the branch circuit to said first fixture;
- a switch cable means for directly interconnecting a second raceway receptacle and said switch receptacle for connecting said wall switch means in circuit with said raceway hot conductor and raceway switch conductor; and
- a switched fixture cable means for directly interconnecting a third raceway receptacle and the fixture receptacle on a second lamp fixture for connecting said second fixture in circuit with said raceway neutral conductor and said raceway switch conductor so that current from said hot conductor flows through said switch means and said raceway switch conductor to said second fixture.

2. The improvement of claim 1 wherein the number of sockets in each receptacle and of prongs in each plug is the same as the number of raceway conductors.

3. The improvement of claim 2 wherein:
said power distribution system is a conventional three-wire A.C. system;
said plurality of raceway conductors further comprises a second hot conductor connected to the power bus and a second floating switch conductor;
said second fixture is a dual-ballast fluorescent lamp fixture containing first and second ballast circuits so that said switched fixture cable means: connects said raceway neutral conductor and first switch conductor to said first ballast circuit, whereby current flows from said first hot conductor through said first switch and first switch conductor to said first ballast circuit; and connects said raceway neutral conductor and said second switch conductor to said second ballast circuit, whereby current flows from said second hot conductor through said second switch and said second conductor to said second ballast circuit; and
said wall switch means comprises first and second switches wired to different ones of the sockets of said switch receptacle so that said switch cable means connects said first switch in circuit with said raceway first hot and switch conductors, and said second switch in circuit with said raceway second hot and switch conductors.

4. In an overhead power distribution system for distributing electrical power to a plurality of overhead lamp fixtures for lighting a floor area and including: at least one branch circuit connected to a power bus, the lamp fixtures being energized from the branch circuit, the branch circuit including a hollow raceway extending over the floor area and enclosing a plurality of raceway conductors; and wall switch means for controlling the supply of power to at least one of the lamp fixtures; the improvement wherein:
the plurality of conductors comprises six raceway conductors: first and second raceway hot conductors and a raceway neutral conductor connected to the power bus; first and second raceway floating switch conductors; and a raceway ground conductor connected to ground; and comprising:
a plurality of identical six-socket connector receptacles spaced along the raceway, the sockets of each receptacle being wired to a different one of said raceway conductors, and the corresponding sockets of each receptacle being wired to the same raceway conductor, the corresponding sockets of each receptacle being identified as A, B, C, D, E and F and being wired to said first and second hot conductors, and first and second switch conductors, said neutral conductor and said ground conductor, respectively;
said switch means comprising first and second wall switches;
a six-socket switch receptacle, identical to said raceway receptacles, and wired to said first and second wall switches such that said first switch is in series between the A and C sockets thereof, and said second switch is in series between the B and D sockets thereof;
a six-socket connector receptacle, identical to said raceway receptacles, on each lamp fixture, each lamp fixture containing two fluorescent lamp ballast circuits electrically connected between the A and E sockets and between the B and E sockets, respectively, of the receptacle;
a plurality of interchangeable pre-wired control cable means having identical six-pronged connector plugs on opposite ends thereof, said plugs being matable with all of said receptacles, each plug having prongs corresponding to the sockets of said receptacles;
said plurality of pre-wired control cable means comprising:
- a switch cable means for directly interconnecting a raceway receptacle and said switch receptacle, the A, B, C, and D prongs of its two plugs being respectively wired together such that, when the receptacles are interconnected, said first switch is effectively connected in series between said first raceway hot conductor and said first raceway switch conductor, and said second switch is effectively connected in series between said raceway second hot conductor and said switch conductor;
- a switched fixture cable means for directly interconnecting a raceway receptacle and the receptacle on one of said lamp fixtures, the C and D sockets of the plug on one end of said unswitched fixture cable means being wired to the A and B sockets, respectively, of the other plug, and the corresponding E and F sockets in both plugs being respectively wired together, such that, when the receptacles are interconnected, one of the ballast circuits of the lamp fixtures is effectively connected in series between said raceway first switch conductor and said raceway neutral conductor, and the other of said ballast circuits is effectively connected in series between said raceway second switch conductor and said raceway neutral conductor, whereby current flows from said hot conductors, through said first and second wall switches, and through said first and second raceway switch conductors to the two ballast circuits, respectively; and an unswitched fixture cable means for directly interconnecting a raceway receptacle and the receptacle on another of the lamp fixtures, and having the corresponding A, B, E and F prongs of its two plugs respectively wired together, so that, when the receptacles are interconnected, current flows from each of the raceway hot conductors, through a different one of the ballast circuits and to the raceway neutral conductor.

* * * * *

UNITED STATES PATENT AND TRADEMARK OFFICE
CERTIFICATE OF CORRECTION

PATENT NO. : 4,367,417

DATED : January 4, 1983

INVENTOR(S) : Casasanta, Salvatore J.

It is certified that error appears in the above—identified patent and that said Letters Patent is hereby corrected as shown below:

Column 8, line 12, wherein the words "and first" should be --said first--.

Column 8, line 58, wherein the word "fixtures" should be --fixture--.

Signed and Sealed this

Twenty-ninth Day of March 1983

[SEAL]

Attest:

GERALD J. MOSSINGHOFF

Attesting Officer

Commissioner of Patents and Trademarks